United States Patent [19]

Bransford, Jr.

[11] 3,884,737

[45] May 20, 1975

[54] METHOD OF FORMING A DECORATIVE PANEL AND WALL

[75] Inventor: Ernest O. Bransford, Jr., Greensboro, N.C.

[73] Assignee: Beaman Corporation, Greensboro, N.C.

[22] Filed: Apr. 16, 1973

[21] Appl. No.: 351,148

[52] U.S. Cl. ............... 156/63; 52/747; 52/DIG. 7; 161/36; 264/261
[51] Int. Cl. .......................................... B44c 3/12
[58] Field of Search .................. 161/36, 37, 39, 19; 156/63, 71; 52/747; 264/261

[56] References Cited
UNITED STATES PATENTS

| | | | |
|---|---|---|---|
| 3,131,514 | 5/1964 | Siek | 156/71 |
| 3,327,442 | 6/1967 | Hermann | 52/747 |
| 3,435,577 | 4/1969 | O'Leary | 156/71 |
| 3,521,418 | 7/1970 | Bartoloni | 161/36 X |
| 3,715,417 | 2/1973 | Pope | 156/71 |

Primary Examiner—William E. Schulz

[57] ABSTRACT

A simulated masonry panel is formed by bonding ceramic brick slabs to a reinforced polyester substrate. The bricks are placed in a prescribed pattern upon an ungelled lamination of polyester resin and fiber glass material. Sand, rock dust, or marble dust is placed over the entire lamination and capillary action of the ungelled resin through the sand or dust bonds the bricks in the lamination. After curing, excess sand or dust is removed.

5 Claims, 8 Drawing Figures

METHOD OF FORMING A DECORATIVE PANEL AND WALL

BRIEF SUMMARY AND OBJECTS OF THE INVENTION

This invention relates generally to the forming of a decorative building panel, and more particularly to a simulated masonry panel formed by bonding thin brick slabs to a polyester substrate.

Briefly, the panels are formed by providing a film of catalyzed polyester resin, preferably reinforced with a fiberglass mat upon a work surface. The bricks are placed on the ungelled laminate in a preselected pattern by utilizing a jig. Prior to gellation, rock or marble dust, or sand, is placed over the entire lamination in an abundant quantity. After curing, the excessive sand or dust mixture is removed and the lamination selvage is trimmed to the desired size for application of the panel upon a wall or other supporting surface. The panels may be mounted upon a wall in abutting relation. The end half bricks on every other course on the panel are eliminated to provide voids between abutting panels. Each void is adapted to receive a zipper brick which is bonded to the substrate of the panel lamination. A caulking of the desired color is placed around the zipper bricks and horizontal joints between panels and a sand or dust mixture is blasted into the caulking.

One of the primary objects of the invention is the provision of a process for forming a simulated masonry panel from thin brick slabs.

Another object of the invention is the provision of a process for covering a wall surface with a plurality of simulated masonry panels joined in such a manner as to give the feel, texture and appearance of an actual brick wall.

A further object of the invention is the provision of an improved method of making a simulated masonry panel which is simple and lends itself to economic production.

Still another object of the inventin is the provision of a new and improved panel formed of thin bricks bonded to a resin substrate.

Other objects and advantages of the invention will become apparent when considered in view of the following detailed description.

DETAILED DESCRIPTION OF THE INVENTION

Figure 1:
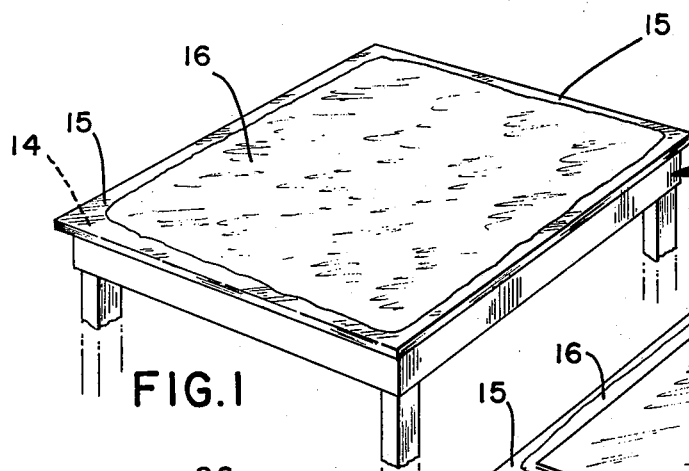
FIG. 1 is a perspective view of a table having a polyester resin coated on a support surface.

Referring to the drawing, the simulated masonry panel is formed from thin ceramic brick slabs bonded to a reinforced polyester substrate. The finished panel area or size is arbitrary with a weight factor being the limiting practical dimension. In one preferred embodiment, the finished panel size is approximately 40 inches by 40 inches and approximately one-half inch thick.

Figure 2:
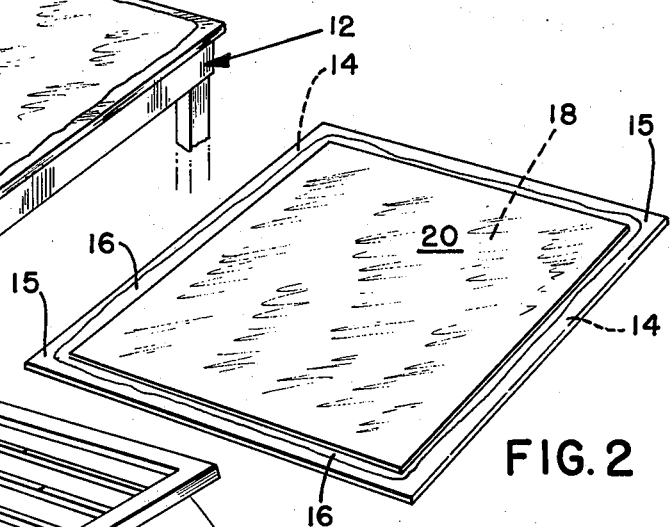
FIG. 2 is a perspective view of a support surface illustrating a fiberglass mat within the resin.

Referring to FIGS. 1 and 2, the panels are formed upon tables 12 by positioning a flat work surface 14 thereon. The work surface 14, which may be Masonite measuring approximately 41 inches by 41 inches is wrapped with a film of uncoated cellophane 15 to prevent the polyester resins from adhering to the surface 14. After placing the wrapped cellophane work surface 14 upon the table 12, a film 16 of polyester resin (67 percent rigid and 33 percent flexible) catalyzed with MEK peroxide is roller coated onto the cellophane 15. The rigid flexible resin mixture provides a substrate capable of expanding and contracting with temperature and weather changes without cracking. A fiberglass mat 18 is placed on the resin film 16 and thoroughly wet out with another film or layer 20 of the polyester resin mixture. The two resin layers 16 and 20 and the fiber glass mat 18 form a thin reinforcing matrix of approximately one-eighth inch thickness.

Figure 3:
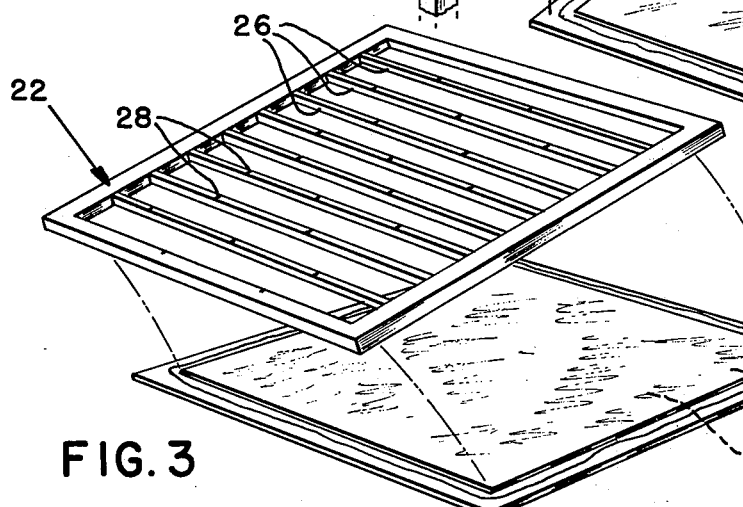
FIG. 3 is a perspective view of the support surface having the resin and fiberglass mat thereon and illustrating the positioning of a jig upon the support surface.
Figure 4:
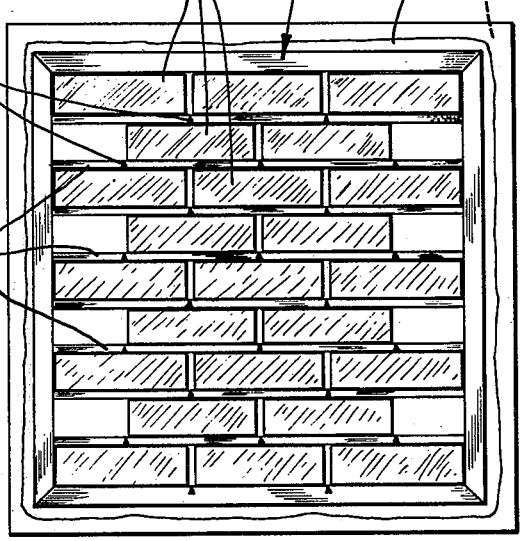
FIG. 4 is a top plan view of the jig positioned upon the support surface and with the individual brick slabs being properly positioned upon the resin by the jig.
Figure 6:
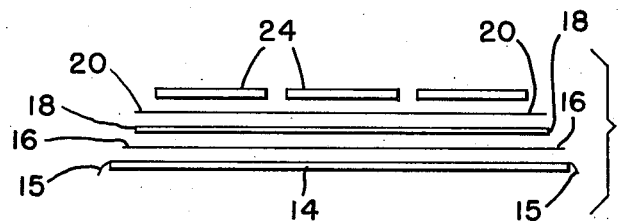
FIG. 6 is an exploded cross-sectional view of certain components of the panel illustrating the cellophane coated support surface, resin, fiberglass mat and brick slabs.
Figure 7:
FIG. 7 is an end elevational view of the laminated panel upon the work surface.

Immediately after placing a second resin film 20 upon the fiberglass, a suitable jig 22 is placed above the ungelled resin and fiberglass laminate, as shown by FIGS. 3 and 4. The jig 22 may be of various sizes, however, in the preferred embodiment the size is such to provide a 40 inch by 40 inch brick pattern. The jig includes members 26 for providing mortar joints of the desired width between brick slabs 24. The thin brick slabs 24, which may be approximately one-fourth inch to one-half inch thick then are placed through the jig 22 and upon the ungelled resin and fiberglass lamination. Indicators 28 may be provided on the jig 22 to facilitate proper and accurate positioning of the brick slabs 24.

After placing the thin bricks 24 in the desired pattern upon the resin, and prior to gellation of the resin, the jig 22 is removed. A granular material 30 such as sand, rock dust, or marble dust or a mixture of sand and dust of the desired mortar color is immediately placed over the entire lamination in abundant quantity. The sand and/or dust may have a depth of approximately one-half inch and the resin for the matrix or laminate wets the sand and/or dust mixture by capillary action of the ungelled resins forming realistic mortar joints between the thin bricks 24. Due to the capillary action, the resin will rise to approximately one-half the thickness of the brick slabs 24 and be bonded to the resin and fiberglass lamination through the polyester resin adhesive media in the lamination. The depth of the mortar joints can be controlled by the coarseness of the mortar sand or dust 30, the amount of catalyst in the resin, by additives, etc.

The lamination then is permitted to gel and cure at room temperature. The cure time depends upon the amount of catalyst used in the resin and may be varied to suit ambient temperature conditions and speed of lamination.

Figure 5:
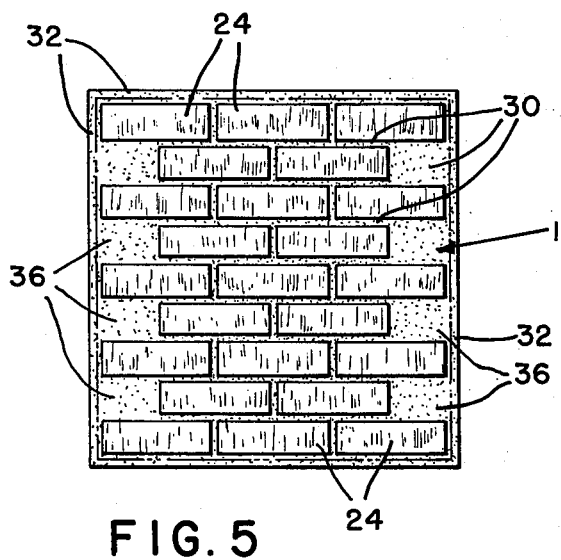
FIG. 5 is a top plan view of the brick slabs positioned upon the resin with the jigs removed and with sand, rock dust or marble dust placed upon the resin between adjacent brick slabs.

After final cure, the excess sand and/or dust mixture 30 is removed and the laminated panel 10 is blown clean leaving approximately a 41 inch by 41 inch simulated brick panel with a half-inch selvage 32 around its entire periphery. The laminated panel 40 is then pulled free of the cellophane coated work surface, resulting in the panel as shown by FIG. 5. The selvage 32 is trimmed in a shear, or by other suitable means, to the desired width for application to a wall or other support surface 34.

Figure 8:
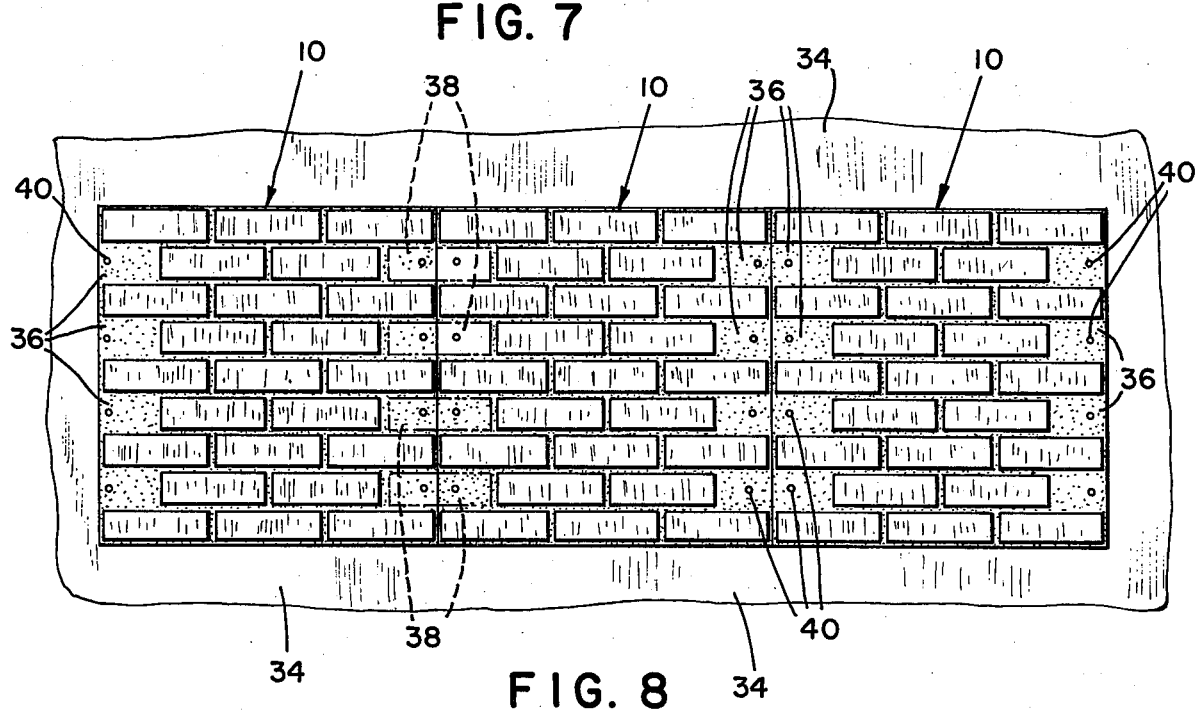
FIG. 8 is a front elevational view of a plurality of cured panels secured in abutting relation upon a wall and before the zipper brick slabs have been applied.

As can be observed from FIG. 5, end half bricks are eliminated from the panel 10 every other course leaving voids 36. The end half bricks on every other course of the simulated masonry panels 10 are eliminated such that when the panels are mounted upon a support surface 34 in aligned abutting relation, each pair of opposed half brick voids 36 provides an area or space for receiving a complete brick 38, which is referred to as a zipper brick, a number of which have been shown in broken lines in FIG. 8.

The panels 10 are mounted upon a support surface 34, which may be brick, block, wood, porcelain, etc., using a two-part polysulfide caulking adhesive and/or mechanical fasteners 40. Required mechanical fasteners 40 may be provided to hold the panels 10 in position until the polysulfide adhesive cures. The mechanical fasteners 40 are placed in the voids 36 where the thin zipper bricks 38 are to be placed, and flush with the polyester and fiberglass substrates such that when the thin zipper bricks 38 are installed, they will cover the heads of the fasteners 40.

After mounting the panels 10 upon the support surface 34, the zipper bricks 38 are placed within the voids 36 and bonded to the substrate of the lamination using a silicon caulking adhesive. A silicon caulking of the desired mortar color is placed around each zipper brick 38 and all horizontal joints between panels. The sand and/or dust mixture 30 used for the simulated mortar is blasted into the silicon caulking. This results in a simulated mortar joint around each zipper brick 38 and in all horizontal joints that matches the simulated mortar joint formed by the sand and/or dust and the capillary action of the resin.

Upon curing of the silicon caulking, the entire surface is washed to remove any residual sand or dust, resulting in a wall surface having the appearance of an actual brick wall.

Panels formed utilizing the above process may be used for corner assemblies, window sills, rowlock courses, etc. such that the panels may be applied to an entire building giving the appearance of an actual brick building.

It is to be understood that the tables 12 may be replaced by pallets supported upon a conveyor.

As an alternative to the above-described process, the MEK peroxide catalyst could be replaced with a catalyst where the catalyzed resin has a pot life of several days at room temperature and must be cured with heat such as Percadox 16 catalyst system. Such system requires the use of unpromoted polyester resins and such laminations may be cured within an oven, for example, at 200° F. for approximately 2 to 3 minutes.

I claim:

1. A method of forming a panel simulating a true masonry wall comprising the steps of; providing an uncured, resin mixture substrate over a selected area of a support, arranging a plurality of bricks in a selected pattern upon said uncured, resin substrate, applying granular material chosen from the group consisting of (a) sand, (b) rock dust, (c) marble dust over the exposed, portions of the ungelled resin mixture between adjacent bricks, and bonding the bricks and at least a portion of the granular material to the resin during curing of the resin by capillary action of the ungelled resin mixture which arises through the granular material and partially encompasses the edges of the bricks.

2. The method as recited in claim 1, wherein the uncured resin mixture substrate is reinforced by providing at least one section of a reinforcing material between layers of the resin mixture.

3. The method as recited in claim 1, wherein bricks are arranged in a selected pattern by placing the bricks through a jig placed over the uncured resin mixture, and the resin mixture is a catalyzed polyester resin.

4. The method as recited in claim 1, wherein the granular mixture placed over the exposed portions of the ungelled resin mixture between bricks gives the appearance of mortar joints and the depth of granular mixture and resin between the bricks is controlled by the coarseness of the granular material.

5. The method as recited in claim 1, wherein the resin substrate is bonded to the bricks and granular material by heat curing the resin.

* * * * *